(12) United States Patent
DePue et al.

(10) Patent No.: US 11,050,691 B1
(45) Date of Patent: Jun. 29, 2021

(54) CROSS-APPLICATION MEDIA EXCHANGE

(71) Applicant: Snap Inc., Santa Monica, CA (US)

(72) Inventors: Charles Burson DePue, Topanga, CA (US); Patrick Mandia, Venice, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/439,293

(22) Filed: Jun. 12, 2019

Related U.S. Application Data

(60) Provisional application No. 62/828,822, filed on Apr. 3, 2019, provisional application No. 62/828,830, filed on Apr. 3, 2019.

(51) Int. Cl.
*H04L 12/58* (2006.01)
*G06F 21/44* (2013.01)

(52) U.S. Cl.
CPC .......... *H04L 51/046* (2013.01); *G06F 21/44* (2013.01); *H04L 51/10* (2013.01); *H04L 51/24* (2013.01)

(58) Field of Classification Search
CPC ....... H04L 51/046; H04L 51/10; H04L 51/24; G06F 21/44
See application file for complete search history.

(56) References Cited

U.S. PATENT DOCUMENTS

| | | | | |
|---|---|---|---|---|
| 8,667,075 B1* | 3/2014 | King | ................ | H04N 21/2187 709/206 |
| 9,710,567 B1* | 7/2017 | Lobdell | ................ | G06F 16/958 |
| 10,063,559 B2* | 8/2018 | Evans | ................ | H04L 63/102 |
| 10,474,422 B1* | 11/2019 | Venti | ................ | H04L 67/02 |
| 2010/0161635 A1* | 6/2010 | Dey | ................ | H04N 21/4788 707/758 |
| 2010/0161965 A1* | 6/2010 | Solin | ................ | H04L 9/3268 713/155 |
| 2011/0283172 A1* | 11/2011 | Berger | ................ | G06Q 10/10 715/202 |
| 2012/0072507 A1* | 3/2012 | Chen | ................ | H04L 51/32 709/206 |
| 2012/0197996 A1* | 8/2012 | Raman | ................ | G06Q 50/01 709/204 |
| 2012/0201362 A1* | 8/2012 | Crossan | ................ | G10L 15/26 379/88.01 |
| 2012/0222083 A1* | 8/2012 | Vaha-Sipila | ................ | G06F 21/53 726/1 |
| 2013/0018957 A1* | 1/2013 | Parnaby | ................ | G06Q 50/01 709/204 |
| 2013/0036117 A1* | 2/2013 | Fisher | ................ | G06F 16/487 707/736 |

(Continued)

*Primary Examiner* — Blake J Rubin
(74) *Attorney, Agent, or Firm* — Schwegman Lundberg & Woessner, P.A.

(57) ABSTRACT

Systems and methods for sharing authentication information are provided. The systems and methods include generating, with a messaging application, a media item using a camera of a client device; identifying a target application that has been authorized by the messaging application to share authentication information with the messaging application; generating a share option associated with the media item for display in a graphical user interface of the messaging application; and in response to receiving a user selection of the share option, enabling the target application to access the media item.

20 Claims, 13 Drawing Sheets

(56) References Cited

U.S. PATENT DOCUMENTS

| | | | |
|---|---|---|---|
| 2013/0080224 A1* | 3/2013 | O'Brien | G06Q 10/10 705/14.14 |
| 2013/0091543 A1* | 4/2013 | Wade | G06F 21/54 726/1 |
| 2013/0159413 A1* | 6/2013 | Davis | H04L 63/02 709/204 |
| 2013/0198275 A1* | 8/2013 | Forsblom | H04L 67/306 709/204 |
| 2013/0254290 A1* | 9/2013 | Grossman | H04L 67/306 709/204 |
| 2013/0297693 A1* | 11/2013 | Miller | G06Q 50/01 709/204 |
| 2013/0311906 A1* | 11/2013 | Mackin | H04L 51/32 715/758 |
| 2013/0346172 A1* | 12/2013 | Wu | G06Q 30/0251 705/14.16 |
| 2014/0006930 A1* | 1/2014 | Hollis | G06F 3/0482 715/234 |
| 2014/0068593 A1* | 3/2014 | McErlane | G06F 9/54 717/171 |
| 2014/0215587 A1* | 7/2014 | Burch | H04W 12/04 726/6 |
| 2014/0250511 A1* | 9/2014 | Kendall | H04W 12/0027 726/6 |
| 2014/0297618 A1* | 10/2014 | Sherman | G06F 16/9558 707/710 |
| 2014/0298260 A1* | 10/2014 | Abowd | G06F 3/04842 715/810 |
| 2014/0337346 A1* | 11/2014 | Barthel | G06F 16/7867 707/738 |
| 2014/0337628 A1* | 11/2014 | Amato | H04L 9/0825 713/171 |
| 2014/0343994 A1* | 11/2014 | Graff | G06Q 10/1095 705/7.19 |
| 2015/0121423 A1* | 4/2015 | Phipps | H04N 21/2665 725/35 |
| 2015/0195314 A1* | 7/2015 | Reed | G06Q 50/01 709/204 |
| 2015/0206349 A1* | 7/2015 | Rosenthal | H04N 5/232935 345/633 |
| 2015/0302185 A1* | 10/2015 | Xu | G06F 21/126 726/17 |
| 2015/0331856 A1* | 11/2015 | Choi | G06Q 50/01 707/746 |
| 2016/0007052 A1* | 1/2016 | Haitsuka | H04N 21/41407 725/115 |
| 2016/0057457 A1* | 2/2016 | Clements | H04N 21/4223 725/109 |
| 2016/0080439 A1* | 3/2016 | Bhathena | H04L 67/06 715/740 |
| 2016/0094501 A1* | 3/2016 | Lee | H04L 51/32 709/206 |
| 2016/0149956 A1* | 5/2016 | Birnbaum | H04L 63/101 726/1 |
| 2016/0295264 A1* | 10/2016 | Yanovsky | H04N 21/4622 |
| 2017/0124664 A1* | 5/2017 | Savenok | H04L 63/10 |
| 2017/0188070 A1* | 6/2017 | Abed | H04N 21/4882 |
| 2017/0264652 A1* | 9/2017 | Karimli | H04L 65/1073 |
| 2017/0329955 A1* | 11/2017 | Hessler | H04W 12/0602 |
| 2018/0137179 A1* | 5/2018 | Kawanabe | G06F 16/951 |
| 2018/0145971 A1* | 5/2018 | Mistry | H04L 9/0825 |
| 2018/0152440 A1* | 5/2018 | Hande | H04L 9/3213 |
| 2018/0198768 A1* | 7/2018 | Ibanez, Jr. | H04L 63/083 |
| 2018/0247077 A1* | 8/2018 | Barrett-Bowen | G06F 21/6245 |
| 2018/0302745 A1* | 10/2018 | Rifkin | G06F 16/587 |
| 2018/0336644 A1* | 11/2018 | Albertine | H04L 67/306 |
| 2018/0351895 A1* | 12/2018 | Rathod | G06F 9/54 |
| 2019/0065263 A1* | 2/2019 | Chen | G06F 9/5011 |
| 2019/0132492 A1* | 5/2019 | Paluri | H04N 5/3415 |
| 2019/0151764 A1* | 5/2019 | Chen | A63F 13/48 |
| 2019/0182554 A1* | 6/2019 | Schupak | H04L 65/608 |
| 2019/0354659 A1* | 11/2019 | Barillari | G06F 16/5838 |
| 2019/0379540 A1* | 12/2019 | Liderman | G06F 9/4843 |
| 2020/0034893 A1* | 1/2020 | Anders | G06F 16/9535 |
| 2020/0068262 A1* | 2/2020 | Saldana | H04N 21/8173 |

\* cited by examiner

CROSS-APPLICATION MEDIA EXCHANGE

CROSS-REFERENCE TO RELATED APPLICATIONS

This application claims the benefit of priority of U.S. Provisional Patent Application No. 62/828,830, entitled "CROSS-APPLICATION MEDIA EXCHANGE," filed on Apr. 3, 2019, and U.S. Provisional Patent Application No. 62/828,822, entitled "MULTIPLE APPLICATION AUTHENTICATION." filed on Apr. 3, 2019, the entireties of which are hereby incorporated by reference herein.

TECHNICAL FIELD

The present disclosure relates generally to exchanging media across multiple applications.

BACKGROUND

Modern-day user devices implement multiple applications on a given device. Users typically maintain specific accounts for each application. As such, to access a given application, the users input the credentials associated with the account for the given application. After the credentials are authenticated, the user can access various features of the given application.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings.

DETAILED DESCRIPTION

Figure 1:
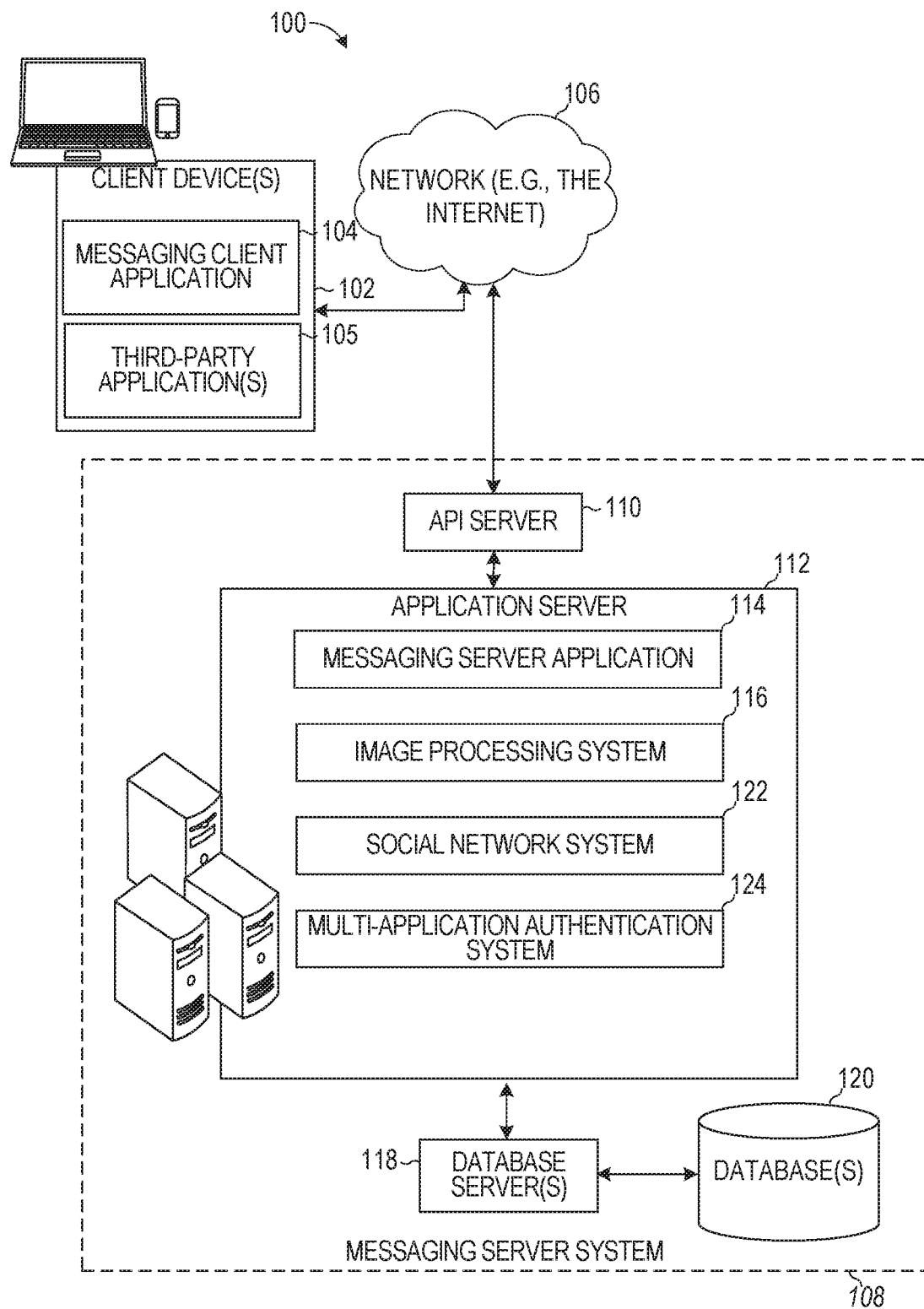
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Typically, users maintain unique accounts for each application that is installed on their devices. To access a given application, the user has to recall their login credentials and input those credentials into the interface of the given application. After the application validates the credentials, the user gains access to the features of the application. Because of the increasing number of applications users install on their devices, remembering the credentials for each application becomes incredibly burdensome and can be discouraging to users. Sometimes users even write down their credentials for each application, which jeopardizes the user's security if those written-down credentials are lost or stolen.

In some instances, a user can access a given application using their account from another application. To do so, the user launches the desired application and instructs the application to retrieve the user's account credentials from another application. While this approach works well in reducing the number of credentials the user has to remember, users often forget which applications are sharing accounts. If security of one of the applications has been compromised and the user does not remember if he or she previously authorized sharing of the user's account with that particular application, the user can be subject to security risks. In addition, such approaches require the user to launch each given application individually to determine whether that application is configured to share the user's account from another application. The process of figuring out which applications are configured to share the user's account is extremely tedious and time consuming for the user and results in a waste of resources or lack of use.

In some instances, users generate media items using interfaces specific to a given application. Because of the lack of seamless integration among the applications that are installed on the given device, the user is limited to accessing the media items on the given application. To access the media items on another application, the user has to manually copy the media items using the given application, if such copying is permitted, and then log into another application to upload the copied media items. This process is very time consuming and tedious and wastes storage and processing resources of the devices. There are no mechanisms in place that allow the user to seamlessly enjoy the media items the user created with one application on another application with minimal consumption of the processing and storage resources.

The disclosed embodiments improve the efficiency of using the electronic device by providing a multi-application authentication system that provides a user with greater control over sharing authorization (authentication) information between multiple applications and provides a user with seamless ability to exchange media items between the applications. Specifically, according to the disclosed embodiments, a messaging application retrieves a list of applications that are installed on a user device. The messaging application searches the list of applications to identify a given application within the list that is configured to share authentication information with the messaging application. In response to identifying the given application, the messaging application displays an option to the user to authorize the messaging application to share the authentication information of the messaging application with the given application. In this way, because the authorization of sharing the authentication information of the messaging application with other applications is performed through the messaging application itself, the messaging application can track and maintain a list of all the applications with which the authentication information has been shared (applications with which authentication information has been shared are referred to as the "connected applications"). The connected application can be a third-party application that is provided by an entity or organization that differs from the entity or organization that provides the messaging application.

In some embodiments, the messaging application presents a graphical user interface that lists all the applications with which the authentication information has been shared. Via the graphical user interface, the user can view the level of authentication information that is being shared with each application. The user can also disconnect or terminate sharing of the authentication information with a selected application via the graphical user interface. In some embodiments, the graphical user interface allows a user to search for and/or view a list of all the applications that are configured to share authentication information with the messaging application. From the list, the user can choose one or more applications with which the messaging application is authorized to share the authentication information.

In response to the user selecting the one or more applications, the messaging application automatically coordinates and communicates with the selected applications to provide the authentication information to the selected applications. In this way, when the user at some later time launches a given one of the selected applications, independently of the messaging application (e.g., from a home screen of the user device), the launched application automatically logs the user into the application using the shared authentication information from the messaging application and does not require the user to input credentials to access features of the launched application.

In some embodiments, after a given application (e.g., a target application) has been authorized by the messaging application to share the authentication information of the messaging application, access to media items captured and generated using the messaging application is automatically, or with minimal user input, provided to the target application. Specifically, according to the disclosed embodiments, a media item is generated, with a messaging application, using a camera of a client device. A target application that has been authorized by the messaging application to share authentication information with the messaging application is identified. A share option associated with the media item is generated for display in a graphical user interface of the messaging application, and, in response to receiving a user selection of the share option, the target application is enabled to access the media item. In some embodiments, the media items include a playlist of videos that are presented according to a sequence one after another. The videos in the playlist may include filters or augmented reality content generated by the messaging application.

In some implementations, the target application is enabled to access the media item via an application programming interface (API) of the messaging application. Specifically, the media item may be encoded in a proprietary format of the messaging application. The target application may present the media item through a graphical user interface of the target application by decoding the media item using a decoder of the messaging application using the API of the messaging application. In some implementations, the target application can download a separate copy of the media item via the API of the messaging application. In some embodiments, the messaging application maintains a viewing metric associated with the media item that represents viewership of the media item on the messaging application and on the target application. The viewing metric is updated when the messaging application receives a request from the target application via the API to play the media item. In some embodiments, a user of the messaging application can delete or disable access to the media item by the messaging application and/or the target application. In response, the target application is prevented from playing or accessing the media item.

FIG. 1 is a block diagram showing an example messaging system 100 for exchanging data (e.g., messages and associated content) over a network 106. The messaging system 100 includes multiple client devices 102, each of which hosts a number of applications, including a messaging client application 104 and a third-party application 105. Each messaging client application 104 is communicatively coupled to other instances of the messaging client application 104, the third-party application 105, and a messaging server system 108 via the network 106 (e.g., the Internet).

Accordingly, each messaging client application 104 and third-party application 105 is able to communicate and exchange data with another messaging client application 104 and third-party application(s) 105 and with the messaging server system 108 via the network 106. The data exchanged between messaging client applications 104, third-party applications 105, and the messaging server system 108 includes functions (e.g., commands to invoke functions) as well as payload data (e.g., text, audio, video, or other multimedia data).

The third-party application(s) 105 and the messaging client application 104 are applications that include a set of functions that allow the client device 102 to access a multi-application authentication system 124. The third-party application 105 is an application that is separate and distinct from the messaging client application 104. The third-party application(s) 105 are downloaded and installed by the client device 102 separately from the messaging client application 104. In some implementations, the third-party application(s) 105 are downloaded and installed by the client device 102 before or after the messaging client application 104 is downloaded and installed. The third-party application 105 is an application that is provided by an entity or organization that is different from the entity or organization that provides the messaging client application 104. The third-party application 105 is an application that can be accessed by a client device 102 using separate login credentials from those used to access the messaging client application 104. Namely, the third-party application 105 can maintain a first user account and the messaging client application 104 can maintain a second user account.

For example, the third-party application 105 can be a social networking application, a dating application, a ride- or car-sharing application, a shopping application, a trading application, a gaming application, or an imaging application. In some embodiments, the third-party application 105 is configured to share authentication information with the messaging client application 104. For example, the third-party application 105 can share authentication information with the messaging client application 104 based on the OAuth 2 flow framework.

To do so, the messaging client application 104 sends an authentication token to an authentication server. The authentication token may include information from a user account for, or corresponding to, the messaging client application 104. The authentication token may uniquely identify the third-party application 105 and be associated with an expiration time. The third-party application 105 communicates with the authentication server to obtain the authentication token. Using the information contained in the authentication token (e.g., a username, a password, a user address, and so forth), the third-party application 105 is able to provide the user access to features of the third-party application 105. Namely, a user can launch the third-party application 105 (independently of the messaging client application 104) and, in response, the third-party application 105 communicates with the authentication server to determine whether the third-party application 105 has a valid token for the user. If the expiration time specified in the token has not yet been reached, the third-party application 105 retrieves the token and logs the user into the third-party application 105 using the information contained in the token. If the expiration time has been reached, the third-party application 105 can request (by sending a message to the messaging client application 104) that the messaging client application 104 renew the token to extend the expiration time. If the messaging client application 104 renews the token, the third-party application 105 automatically logs the user into the third-party application 105 and enables the user to access the features of the third-party application 105.

In some embodiments, the messaging client application 104 presents a graphical user interface that allows the user to view connected applications that have been previously authorized by the messaging client application 104 to share the authentication information from the messaging client application 104. The graphical user interface may include an option for each application that allows the user to instruct the messaging client application 104 to discontinue sharing the authentication information. In response to the user selecting the option to discontinue sharing the authentication information, the messaging client application 104 communicates with the authentication server (not shown) the specific identity of the third-party application 105 that is associated with the selected option and an indication to expire or revoke the token for that application. At a later point, the user can select an option to connect the application that has been disconnected, at which time the messaging client application 104 communicates with the authentication server the specific identity of the third-party application 105 that is associated with the selected option and an indication to renew or generate the token for that application.

In some embodiments, the messaging client application 104 presents a graphical user interface that allows the user to search for connected applications that are configured to share authentication information with the messaging client application 104. The user can type in text that represents a name of an application that the user is interested in. As the user types in text, a search is continuously performed within a list of applications that are configured to share authentication information with the messaging client application 104. The search through the list identifies applications on the list that have titles that at least partially match the partial text input. As applications are identified, identifiers of such applications are presented in the graphical user interface with an option to allow the user to select to connect the application. In response to receiving the user selection of such an option to connect the application, the messaging client application 104 communicates with the authentication server the specific identity of the third-party application 105 that is associated with the selected option and an indication to provide an authentication token for that application.

In some embodiments, the messaging client application 104 presents a graphical user interface that lists all the applications that are configured to share authentication information with the messaging client application 104. The applications on the list are presented in the graphical user interface with an option to allow the user to select to connect the application. In response to receiving the user selection of such an option to connect the application, the messaging client application 104 communicates with the authentication server the specific identity of the third-party application 105 that is associated with the selected option and an indication to provide an authentication token for that application. In some embodiments, a user can select to connect all or disconnect all applications to automatically have the messaging client application 104 generate and provide tokens to each application or revoke previously provided tokens, respectively. A unique user identifier is communicated and stored for each connected application locally or remotely after the connected application has been authorized to share the authentication information. This way, when a given connected application is launched by the user (e.g., from a home screen of the client device), the connected application accesses the previously stored unique user identifier and retrieves the associated authentication token for the user to log the user into the connected application if the authentication token is not expired.

In some embodiments, features of the messaging client application 104 are selectively enabled based on whether a given third-party application 105 has been connected to the messaging client application 104. For example, a feature to share media items (e.g., a playlist of videos generated by the messaging client application 104) with other applications can be in a disabled state when the given third-party application 105 has not yet been connected to the messaging client application 104. In response to the user selecting an option to share authentication information with the third-party application 105, the feature to share media items with other applications, and particularly with the third-party application 105, becomes enabled. The user can select and interact with the feature to automatically transmit to the third-party application 105 any media items that are captured, stored, and manipulated by the messaging client application 104. For example, the messaging client application 104 may present, in a graphical user interface, a share option for the media items, allowing the user to selectively enable access to the media items by one or more third-party applications 105 by selecting individually the media items and/or the one or more third-party applications 105. Each third-party application 105 is presented to the user in the graphical user interface using a graphical representation (e.g., a logo) of the third-party application 105. The graphical representation may be requested by the messaging client application 104 from the third-party application 105.

The third-party application 105, once connected, is configured to use an API of the messaging client application 104 to display or play back any of the media items that have been transmitted to and shared with the third-party application 105 by the messaging client application 104. Namely, the media items may be configured to only be played using a video or image player (decoder) of the messaging client application 104, and the API may enable the third-party application 105 to access the player of the messaging client application 104 to play the media items. In this way, because playback of the media items by the third-party application 105 is controlled by the API of the messaging client application 104, the messaging client application 104 can compute metrics or a view count for each media item even when such a media item is played or accessed by the third-party application 105 outside of (independently of a graphical user interface of) the messaging client application 104. Specifically, a given media item may be transmitted and shared by the messaging client application 104 with first and second third-party applications 105. If such a media item is played 100 times by users of the first third-party application 105 and 200 times by users of the second third-party application 105 through the API of the messaging client application 104, the messaging client application 104 can track views and determine that the view count of the particular media item is 300 even though the media item was accessed by the first and second third-party applications 105. The media items are decoded by the player of the messaging client application 104 and are presented in a graphical user interface of the respective third-party application 105.

The messaging client application 104 allows a user to selectively disable the third-party application 105 from accessing the media items. For example, after a given media item has been selected to be enabled for access by the third-party application 105, a user of the messaging client application 104 can select an option to disable the access. In some implementations, the user can delete the media item with the messaging client application 104, which automatically disables future access by the third-party application 105. In some implementations, to disable access, the messaging client application 104 may transmit an indication to the third-party application 105 to remove the specific media item and/or may prevent access to the decoder of the messaging client application 104 when a request to play the media item is received via the API of the messaging client application 104 from the third-party application 105. In some embodiments, the messaging client application 104 provides a graphical user interface that presents a search interface. The search interface allows a user to search titles of media items that are being shared with the third-party application 105.

The messaging server system 108 provides server-side functionality via the network 106 to a particular messaging client application 104. While certain functions of the messaging system 100 are described herein as being performed either by a messaging client application 104 or by the messaging server system 108, it will be appreciated that the location of certain functionality either within the messaging client application 104 or within the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotations and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 and the third-party application 105 in order to invoke functionality of the application server 112. The API server 110 exposes various functions supported by the application server 112, including account registration; login functionality; the sending of messages, via the application server 112, from a particular messaging client application 104 to another messaging client application 104 or a third-party application 105; the sending of media files (e.g., images or video) from a messaging client application 104 to a messaging server application 114, for possible access by another messaging client application 104 or a third-party application 105; the setting of a collection of media data (e.g., story); the retrieval of such collections; the retrieval of a list of friends of a user of a client device 102; the retrieval of messages and content; the adding and deleting of friends to and from a social graph; the location of friends within a social graph; access to user conversation data; access to avatar information stored on the messaging server system 108; and opening an application event (e.g., relating to the messaging client application 104).

The application server 112 hosts a number of applications and subsystems, including the messaging server application 114, an image processing system 116, a social network system 122, and the multi-application authentication system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. A portion of the image processing system 116 may also be implemented by the multi-application authentication system 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with whom a particular user has relationships or whom the particular user is "following" and also the identification of other entities and interests of a particular user. Such other users may be referred to as the user's friends. The social network system 122 may access location information associated with each of the user's friends to determine where they live or are currently located geographically. The social network system 122 may maintain a location profile for each of the user's friends indicating the geographical location where the user's friends live.

The multi-application authentication system 124 manages authentication sharing by the messaging client application 104 with third-party applications 105. In some embodiments, the multi-application authentication system 124 manages the authentication sharing in accordance with the OAuth 2 flow framework. The multi-application authentication system 124 communicates with the messaging client application 104 to receive indications of which third-party applications 105 the messaging client application 104 is authorized to share authentication information with. The multi-application authentication system 124 generates tokens for each of the indicated third-party application 105 and manages expiration of such tokens. The third-party applications 105 communicate with the multi-application authentication system 124 to obtain the generated tokens to enable a user of the client device 102 to access the third-party applications 105 without creating a specific account for the third-party applications 105 and/or inputting credentials to log into the third-party applications 105. The multi-application authentication system 124 also manages sharing of media items by the messaging client application 104 with third-party applications 105.

The application server 112 is communicatively coupled to the database server 118, which facilitates access to the database 120 in which is stored data associated with messages processed by the messaging server application 114. The database 120 may be a third-party database. For example, the application server 112 may be associated with a first entity, and the database 120 or a portion of the database 120 may be associated with and hosted by a second, different entity. In some implementations, the database 120 stores user data that the first entity collects about each of the various users of a service provided by the first entity. For example, the user data includes user names, passwords, addresses, friends, activity information, preferences, videos or content consumed by the user, and so forth. The data may be provided by the users voluntarily or may be collected automatically by the first entity and stored in the database 120. In some implementations, the data is provided by the user for using a particular function of the service provided by the first entity. In some cases, this same data can be used by another, new function or feature or service provided by the first entity. The user may or may not be interested in the new function or feature or service provided by the first entity, and accordingly there may be restrictions on the way in which the user's data can be used without express permission by the user. These uses are typically controlled and regulated according to privacy regulations.

Figure 2:
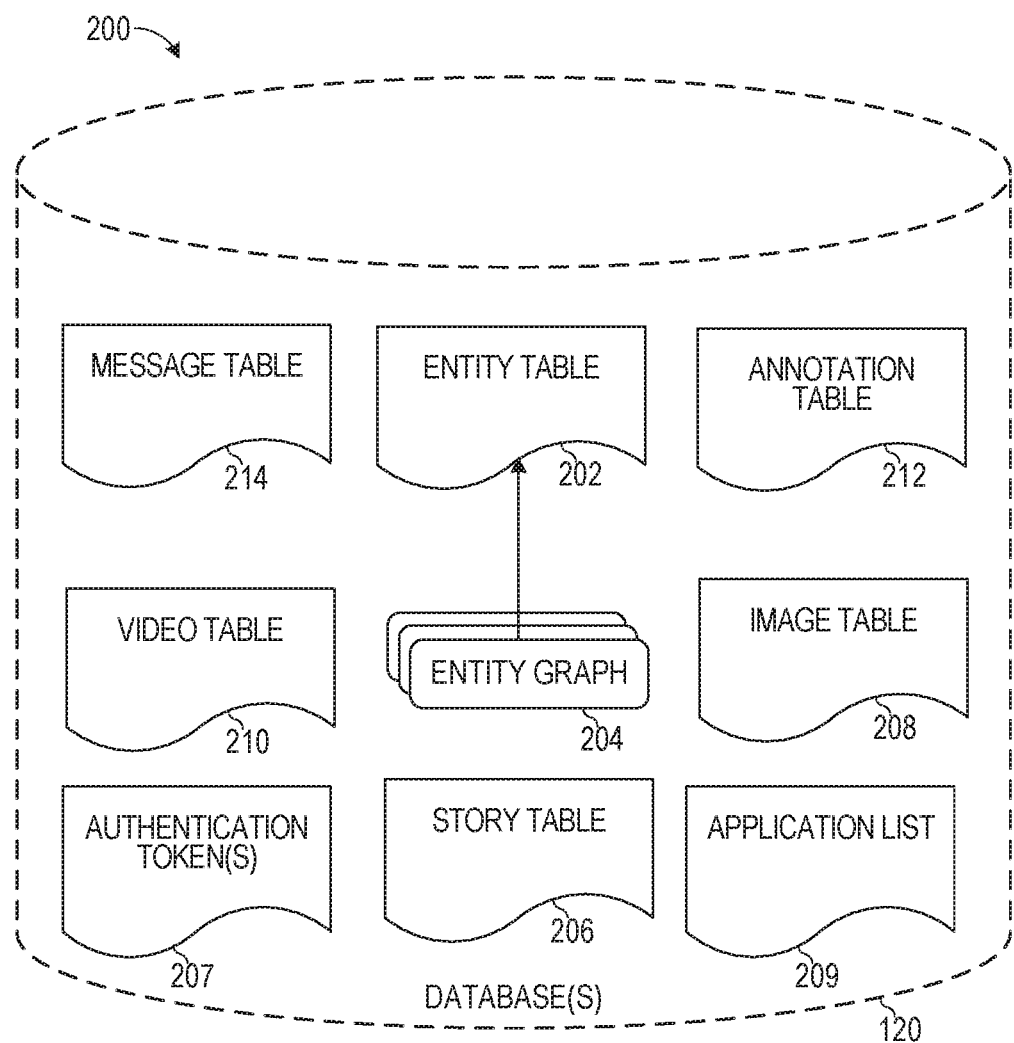
FIG. 2 is a schematic diagram illustrating data which may be stored in a database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 furthermore stores information regarding relationships and associations between entities. Such relationships may be social, professional (e.g., work at a common corporation or organization), interest-based, or activity-based, merely for example.

The message table 214 may store a collection of conversations between a user and one or more friends or entities. The message table 214 may include various attributes of each conversation, such as the list of participants, the size of the conversation (e.g., number of users and/or number of messages), the chat color of the conversation, a unique identifier for the conversation, and any other conversation related feature(s).

The database 120 also stores annotation data, in the example form of filters, in an annotation table 212. The database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the annotation table 212 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the message table 214. The entity table 202 may associate various annotations from the annotation table 212 with various images and videos stored in the image table 208 and the video table 210.

Authentication tokens 207 store a list of tokens used by third-party applications 105 to provide a user of a client device 102 access to the third-party applications 105. Each token may include a list of permissions associated with a given third-party application 105, an identity (e.g., a name) of the third-party application 105, user information provided by the messaging client application 104, an expiration time, and any other suitable information. The authentication tokens 207 are generated and provided by the messaging client application 104 when a user authorizes sharing authentication information with a given third-party application 105. The messaging client application 104 can renew or update expiration times in the authentication tokens 207 when a given third-party application 105 requests renewal of the expiration time for its associated token. The messaging client application 104 can revoke or expire any given authentication token 207 when a user instructs the messaging client application 104 to disconnect an associated third-party application 105. The messaging client application 104 can revoke or expire any given authentication token 207 when an expiration time is reached and/or when fraud is detected, causing the messaging client application 104 to disconnect an associated third-party application 105.

An application list 209 stores a list of all applications installed on a given client device 102. As new applications are installed on the given client device 102, the client device 102 updates the application list 209 with the name and identity of the installed application. The application list 209 also stores a list of all the applications that are configured to share authentication information with the messaging client application 104. Namely, any application that the messaging client application 104 determines to have the same authentication protocol as the messaging client application 104 and has been previously approved by a developer of the messaging client application 104 can be added to the list of applications configured to share authentication information with the messaging client application 104.

A story table 206 stores data regarding collections of messages and associated image, video, or audio data, which are compiled into a collection (e.g., a story or a gallery). The creation of a particular collection may be initiated by a particular user (e.g., each user for whom a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story." which is a collection of content from multiple users that is created manually, automatically, or using a combination of manual and automatic techniques. For example, a "live story" may constitute a curated stream of user-submitted content from various locations and events. Users whose client devices have location services enabled and are at a common location or event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
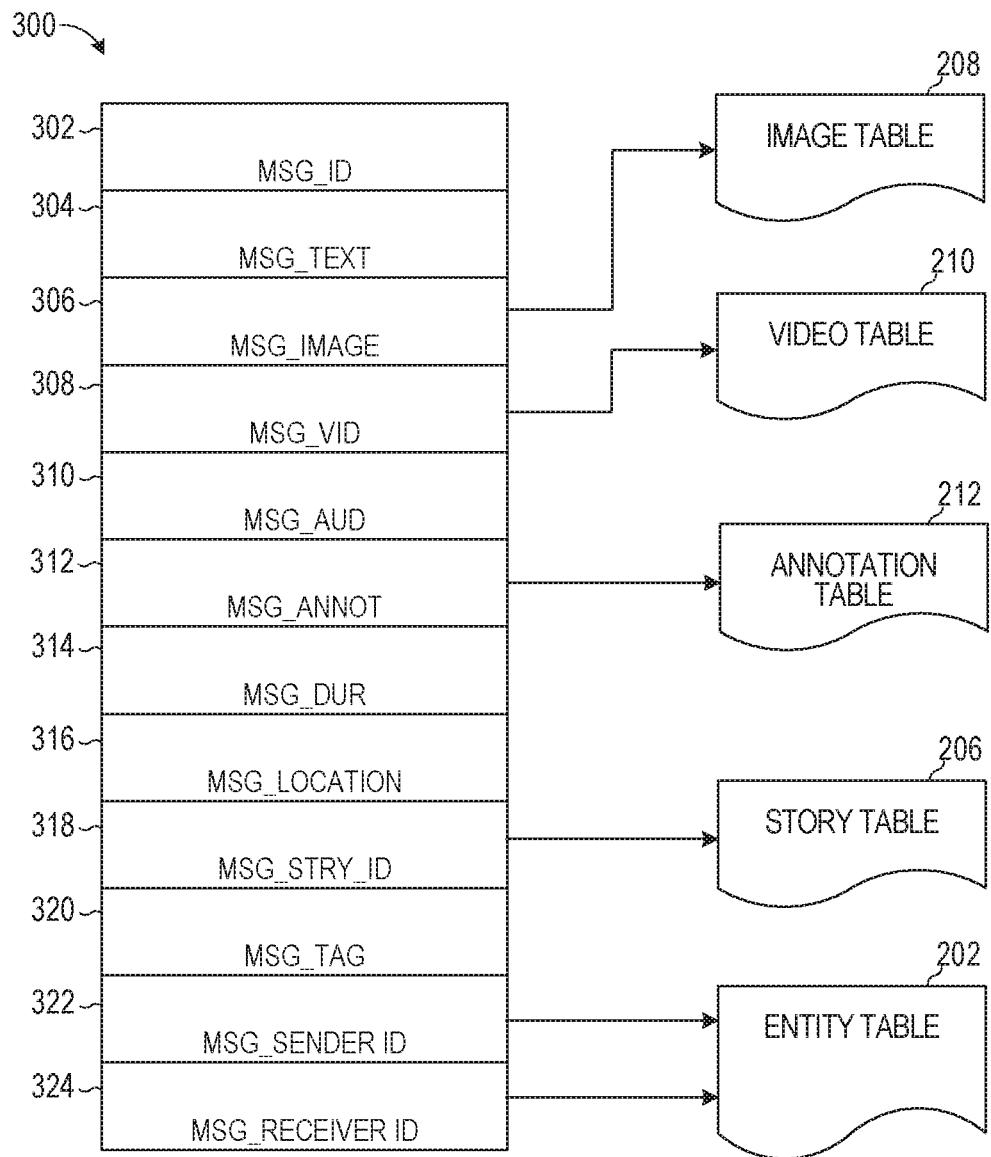
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

A message identifier 302: a unique identifier that identifies the message 300.

A message text payload 304: text, to be generated by a user via a UI of the client device 102 and that is included in the message 300.

A message image payload 306: image data, captured by a camera component of a client device 102 or retrieved from memory of a client device 102, and that is included in the message 300.

A message video payload 308: video data, captured by a camera component or retrieved from a memory component of the client device 102 and that is included in the message 300.

A message audio payload 310: audio data, captured by a microphone or retrieved from the memory component of the client device 102, and that is included in the message 300.

Message annotations 312: annotation data (e.g., filters, stickers, or other enhancements) that represents annotations to be applied to the message image payload 306, message video payload 308, or message audio payload 310 of the message 300.

A message duration parameter 314: a parameter value indicating, in seconds, the amount of time for which content of the message 300 (e.g., the message image payload 306, message video payload 308, and message audio payload 310) is to be presented or made accessible to a user via the messaging client application 104.

A message geolocation parameter 316: geolocation data (e.g., latitudinal and longitudinal coordinates) associated with the content payload of the message 300. Multiple message geolocation parameter 316 values may be included in the payload, with each of these parameter values being associated with respective content items included in the content (e.g., a specific image within the message image payload 306, or a specific video in the message video payload 308).

A message story identifier 318: an identifier value identifying one or more content collections (e.g., "stories") with which a particular content item in the message image payload 306 of the message 300 is associated. For example, multiple images within the message image payload 306 may each be associated with multiple content collections using identifier values.

A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.

A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of the message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
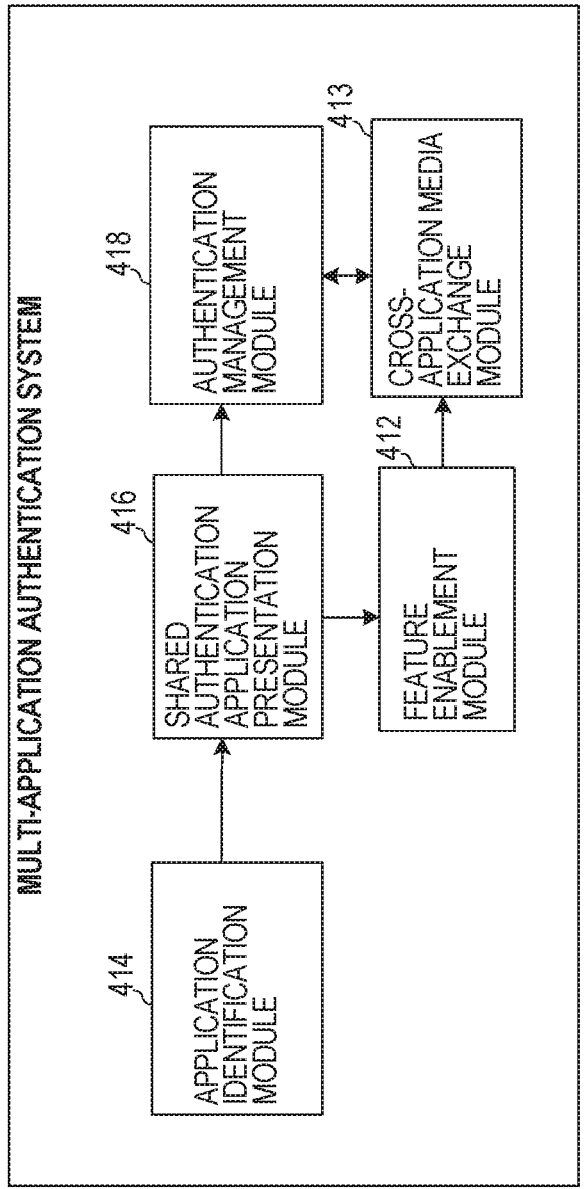
FIG. 4 is a block diagram showing an example multi-application authentication system, according to example embodiments.

FIG. 4 is a block diagram showing an example multi-application authentication system 124, according to example embodiments. The multi-application authentication system 124 includes an application identification module 414, a shared authentication application presentation module 416, a feature enablement module 412, an authentication management module 418, and a cross-application media exchange module 413. The application identification module 414 communicates with a client device 102 to obtain a list of third-party applications 105 that are currently installed on the client device 102. The application identification module 414 can retrieve this list from the application list 209.

The application identification module 414 retrieves a list from the application list 209 that identifies all the third-party applications 105 that are configured to share authentication information with the messaging client application 104. The application identification module 414 compares the two lists and identifies which of the installed applications on the client device 102 are also configured to share authentication information with the messaging client application 104. In some implementations, the application identification module 414, rather than comparing the two lists, can analyze configuration information for each application that is installed on the client device 102. The configuration information can be analyzed to determine whether the installed application supports sharing the authentication information with the messaging client application 104 (e.g., whether the application supports an authentication protocol that is the same as or similar to the authentication protocol of the messaging client application 104).

In some embodiments, the application identification module 414 receives a user search query and identifies third-party applications 105 that are or are not installed on the client device 102 that have a name that matches the search query. The application identification module 414 determines whether the matching applications are configured to share authentication information with the messaging client application 104. If so, the application identification module 414 communicates such third-party applications 105 to the shared authentication application presentation module 416.

The application identification module 414 communicates the identified third-party applications 105 that are installed and are configured to share authentication information with the messaging client application 104 to the shared authentication application presentation module 416. In some implementations, the application identification module 414 communicates to the shared authentication application presentation module 416 applications that are not installed on the client device 102 but that are configured to share authentication information with the messaging client application 104. Namely, any application that is not on the list of installed applications but is on the list of applications configured to share authentication information with the messaging client application 104 can be identified and provided to the shared authentication application presentation module 416.

The shared authentication application presentation module 416 presents a graphical user interface on the messaging client application 104 that represents the third-party applications 105 identified by the application identification module 414. The graphical user interface may indicate to the user the third-party applications 105 that are installed on the client device 102 and that are configured to share authentication information with the messaging client application 104. The graphical user interface includes an option for each application allowing the user to instruct the messaging client application 104 to connect to the particular third-party application 105. In response to receiving a user selection of the option, the shared authentication application presentation module 416 identifies the particular third-party application 105 to the authentication management module 418 and/or to the feature enablement module 412. The authentication management module 418 can generate a token for the particular third-party application 105 with a specified expiration time. The token is transmitted to the third-party application 105 and stored in a database associated with the third-party application 105. The token can be used by the particular third-party application 105 to allow the user to access features of the third-party application 105 without logging in and without providing credentials. The third-party application 105 uses the token to identify the user and present content to the user based on the user's information.

In some embodiments, the shared authentication application presentation module 416 presents a graphical user interface that indicates to the user the connected third-party applications 105 that are installed on the client device 102 and have been previously selected by the user to connect and share authentication information with the messaging client application 104. The graphical user interface includes an option for each application allowing the user to instruct the messaging client application 104 to disconnect from the particular third-party application 105. In response to receiving a user selection of the option, the shared authentication application presentation module 416 identifies the particular third-party application 105 to the authentication management module 418 and/or to the feature enablement module 412. The authentication management module 418 can revoke a token for the particular third-party application 105 to prevent the third-party application 105 from accessing the user information contained in the token and associated with the messaging client application 104. The authentication management module 418 can manage the tokens and authentication in accordance with the OAuth 2 flow framework.

The feature enablement module 412 identifies features of the messaging client application 104 that are in an enabled or disabled state and that are associated with one or more third-party applications 105. The feature enablement module 412 determines that a given third-party application 105 has been selected by the user for enabling the messaging client application 104 to share authentication information with the third-party application 105. In response, the feature enablement module 412 enables the corresponding feature of the messaging client application 104 for that third-party application 105. For example, the feature enablement module 412 may enable an option on the messaging client application 104 allowing the user to share, with the third-party application 105, automatically or selectively media items the user generates using the messaging client application 104. In response to enabling this option, the user is presented in a graphical user interface with an option to select to share one or more media items, that were generated using the image/video capture features of the messaging client application 104, with the third-party application 105.

The feature enablement module 412 may provide an API for the third-party application 105 to utilize to enable a user to play back the selected media items on the third-party application 105 through a graphical user interface of the third-party application 105. The API may also allow the third-party application 105 to download and generate a transcoded copy of the selected media items. The feature enablement module 412 may also revoke access to any previously shared media items, preventing the third-party application 105 from playing or accessing the media items. For example, the access to the player (decoder) needed to play the media items may be disabled using the API, which prevents the third-party application 105 from playing the media items previously provided to the third-party application 105. This way, the messaging client application 104 maintains control over sharing and playback of media items, generated by the messaging client application 104, by the third-party applications 105. Namely, the third-party application 105 transmits to the messaging client application 104, via the API of the messaging client application 104, a request to play a given media item, the request including an identifier of the third-party application 105 and an identifier of the media item. The messaging client application 104 searches a database to determine whether the given media item has been authorized and selected by the user to be shared with the third-party application 105 associated with the identifier. If the given media item has been authorized and selected to be shared with the third-party application 105, the messaging client application 104 returns, via the API, decoded content of the given media item for the third-party application 105 to display. If the given media item has not been authorized and selected to be shared with the third-party application 105, the messaging client application 104 returns to the third-party application 105, via the API, a message denying the request to access the given media item.

In some embodiments, the feature enablement module 412 handles the sharing of media items with the third-party application 105 via the cross-application media exchange module 413. The cross-application media exchange module 413 may present to a user a graphical user interface identifying a given media item to be shared. The graphical user interface may list the user's friends within the messaging client application 104 and one or more third-party applications 105. The user can select any one of the user's friends and any one of the listed third-party applications 105 with which to share the given media item. In some embodiments, the third-party applications 105 that are included in the list are limited to those that have been previously connected to the messaging client application 104. In some embodiments, other third-party applications 105 that have not yet been connected or are in a disconnected state are listed with an option to connect the messaging client application 104 with the other third-party applications 105. The cross-application media exchange module 413 provides the given media item to the selected friends, such as in a message using the messaging client application 104. The cross-application media exchange module 413 provides the given media item to one or more selected third-party applications 105 by sending an identifier of the given media item to the selected third-party applications 105.

The selected third-party applications 105 display the media item on a graphical user interface of the selected third-party applications 105 by using a decoder of the messaging client application 104. Specifically, the selected third-party applications 105 access a decoder or player of the messaging client application 104 via an API function call using the identifier of the media item. The decoded content of the media item is returned by the function call from the messaging client application 104 to the selected third-party applications 105. The selected third-party applications 105 can then display the decoded content of the media item in the graphical user interface of the respective selected third-party applications 105. The cross-application media exchange module 413 maintains viewership metrics for each media item that is shared and accessed by selected third-party applications 105. To do so, whenever an API function call is received by the messaging client application 104 from a third-party application 105 to play a given media item, the cross-application media exchange module 413 updates or increments a viewership metric for the identified media item. The viewership metric can be displayed to a user of the messaging client application 104 and represents a number of times the media item has been viewed by users of the messaging client application 104 and/or users of various third-party applications 105 which have been enabled to access the media item. In some embodiments, the number of times the media item has been viewed is separately tracked and presented to indicate the number of times the media item was viewed by users of the messaging client application 104 and separately the aggregate number of times the media item was viewed by users of one or more third-party applications 105.

In some embodiments, the cross-application media exchange module 413 may prevent a user from selecting a third-party application 105 with which to share a given media item. Specifically, the cross-application media exchange module 413 may determine whether sharing the media item and enabling access to the media item by third-party applications 105 violates copyright protection associated with the media item and/or sponsorship rules associated with the media item. In such cases, the cross-application media exchange module 413 may present the third-party applications 105 that are connected in the sharing screen of the messaging client application 104 but in a disabled state. This prevents the user from selecting the option to share access to the media item with the indicated third-party applications 105 even though such applications are connected. The cross-application media exchange module 413 may continue to simultaneously present in the graphical user interface options to share the media item with the user's friends on the messaging client application 104 because access by those friends would be restricted to the messaging client application 104 and would not violate the rights associated with the given media item.

In some embodiments, the cross-application media exchange module 413 may receive a user request to disable access to one or more selected third-party applications 105. In response, the cross-application media exchange module 413 may instruct the selected third-party applications 105 to no longer present the media item on the graphical user interface of the selected third-party applications 105. Alternatively, or in addition, the cross-application media exchange module 413 may prevent decoding the media item when a request is received from the function call of the API by the selected third-party applications 105. This disables the selected third-party applications 105 from displaying the media item and prevents access. In some embodiments, access to the media item is automatically prevented after a predetermined time interval (e.g., after seven days). In such cases, the cross-application media exchange module 413 may automatically prevent future access to the media item by the third-party applications 105 with which the media item has been shared after the seven-day time interval.

Figure 5:
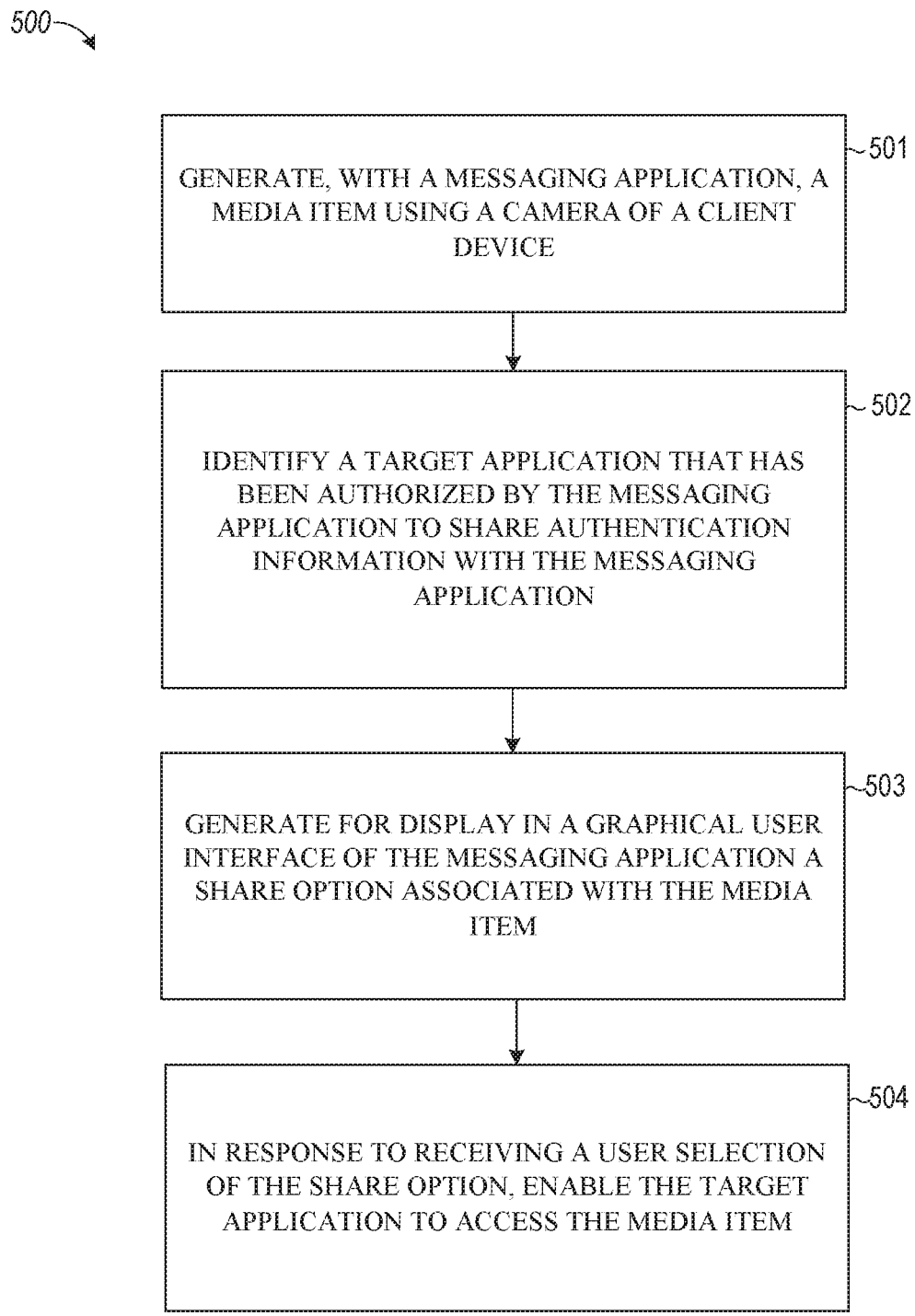
FIG. 5 is a flowchart illustrating example operations of the multi-application authentication system, according to example embodiments.

FIG. 5 is a flowchart illustrating example operations of the multi-application authentication system 124 in performing a process 500, according to example embodiments. The process 500 may be embodied in computer-readable instructions for execution by one or more processors such that the operations of the process 500 may be performed in part or in whole by the functional components of the messaging server system 108, the client device 102, the messaging client application 104, and/or third-party application 105; accordingly, the process 500 is described below by way of example with reference thereto. However, in other embodiments, at least some of the operations of the process 500 may be deployed on various other hardware configurations. The process 500 is therefore not intended to be limited to the messaging server system 108 and can be implemented in whole, or in part, by any other component. Some or all of the operations of the process 500 can be in parallel, out of order, or entirely omitted.

At operation 501, the multi-application authentication system 124 generates, with a messaging application, a media item using a camera of a client device. For example, the messaging client application 104 presents a graphical user interface that includes a live camera feed of the camera of the client device 102. Through this graphical user interface, the user can generate a playlist of videos and can visually augment the images of the videos by adding one or more graphical elements and/or augmented reality content to the videos, such as using filters.

At operation 502, the multi-application authentication system 124 identifies a target application that has been authorized by the messaging application to share authentication information with the messaging application. For example, the application identification module 414 identifies uninstalled or installed third-party applications 105 that are connected to or disconnected from the messaging client application 104 and provides those applications to the shared authentication application presentation module 416. The cross-application media exchange module 413 communicates with the shared authentication application presentation module 416 to determine with which third-party applications 105 the user has selected to connect and share authentication information of the messaging client application 104.

At operation 503, the multi-application authentication system 124 generates for display in a graphical user interface of the messaging application a share option associated with the media item. For example, the cross-application media exchange module 413 presents a graphical user interface to the user to selectively choose those third-party applications 105 to which access to selected media items is enabled. In some embodiments, the cross-application media exchange module 413 automatically provides access to any media item of a given type (e.g., a playlist of videos) to previously selected third-party applications 105 which have been authorized to share authentication information of the messaging client application 104.

At operation 504, the multi-application authentication system 124, in response to receiving a user selection of the share option, enables the target application to access the media item. For example, the cross-application media exchange module 413 receives an API function call from a given third-party application 105 to access the media item. In response, the cross-application media exchange module 413 uses a decoder or player of the messaging client application 104 to decode the content of the media item and provide as a response to the API function call the decoded content of the media item. The third-party application 105 presents the decoded content in a graphical user interface of the third-party application 105.

Figure 6:
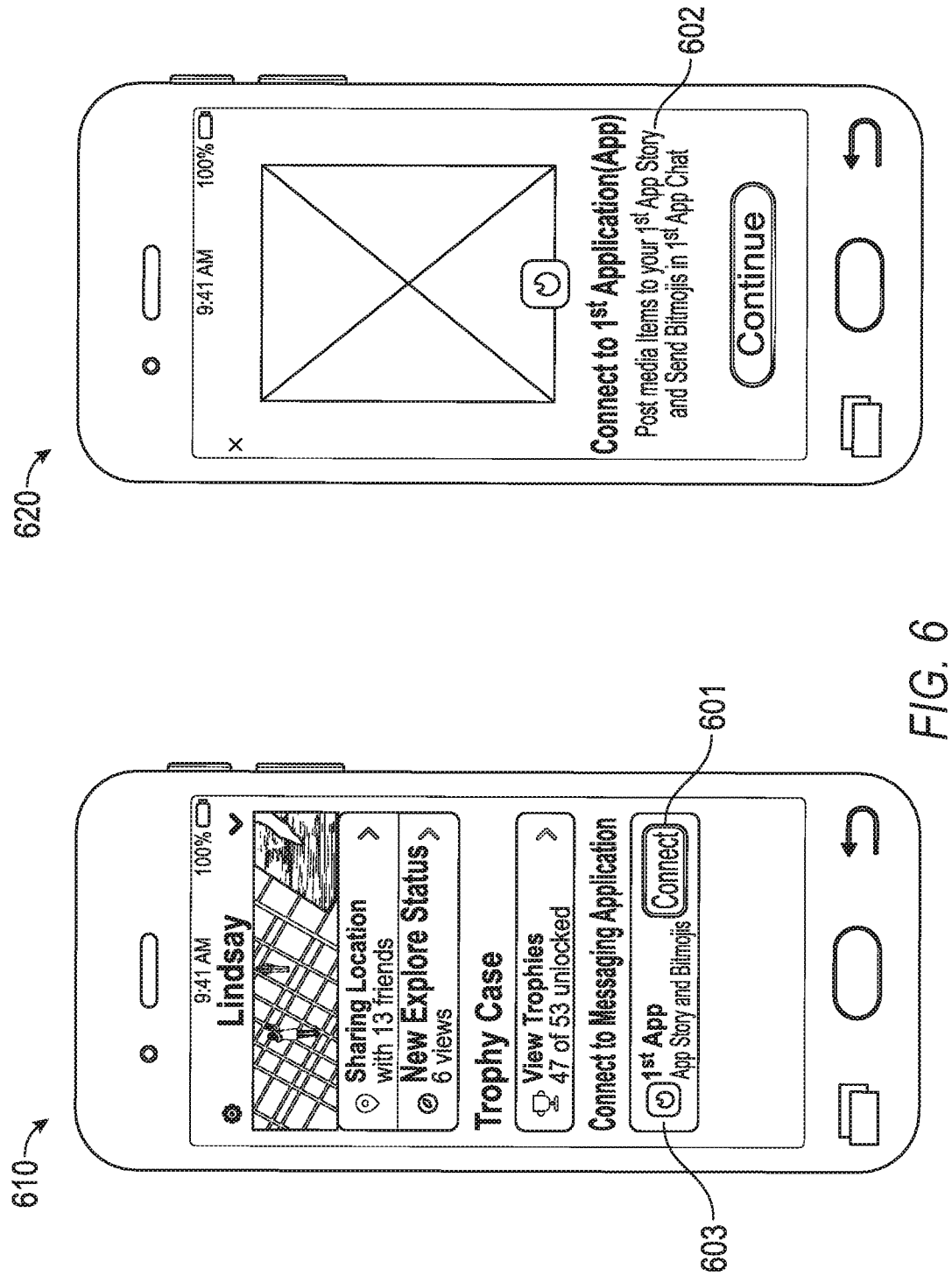
FIGS. 6, 7, and 8A-8D illustrate example inputs and outputs of the multi-application authentication system, according to example embodiments.

FIGS. 6, 7, and 8A-8D illustrate example inputs and outputs of the multi-application authentication system 124, according to example embodiments. As shown in FIG. 6, in an example graphical user interface 610 of the messaging client application 104, a given third-party application 603 is identified as being installed on the client device 102. The given third-party application 603 is determined to be configured to share authentication information with the messaging client application 104. In response, an option 601 is provided in the interface 610 allowing the user to connect the given third-party application 603 with the messaging client application 104. In response to a user selection of the option 601, a graphical user interface 620 of the messaging client application 104 is presented. The user interface 620 provides information 602 about the third-party application 603 and the features of the messaging client application 104 that are enabled if the user chooses to connect to the third-party application 603.

Figure 7:
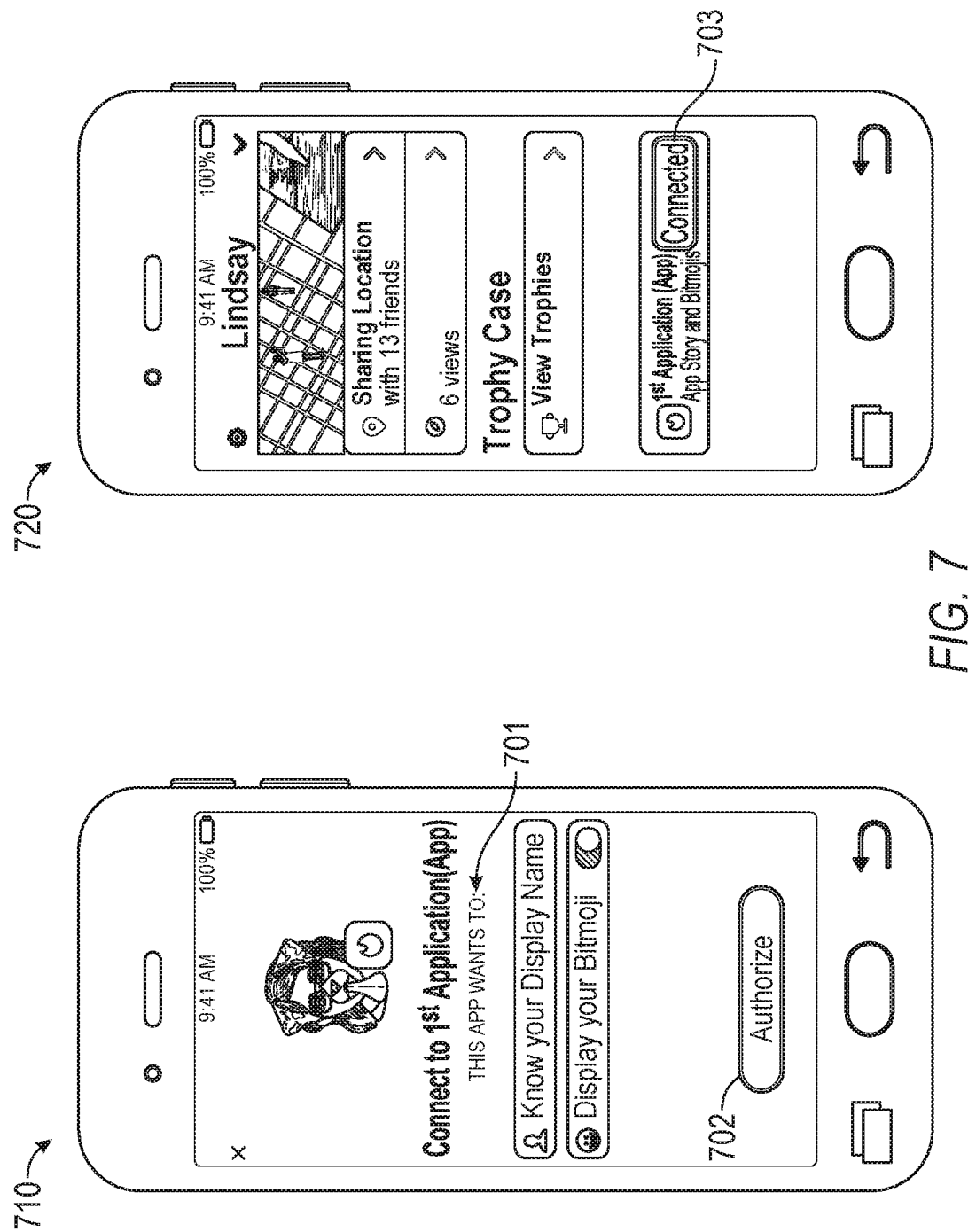

As shown in FIG. 7, a graphical user interface 710 of the messaging client application 104 is presented in response to a user indication to continue to authorize the third-party application 603. The user interface 710 indicates a level of access 701 that the third-party application 603 requests of the authentication information (e.g., a name of the user, a location of the user, an avatar of the user, and so forth). The user can selectively enable and disable certain levels of access 701. After making the selections of the levels of access the user authorizes, the user selects an authorize option 702. In response to receiving the user selection of the authorize option 702, the multi-application authentication system 124 generates a token for the third-party application 603 with information from the user account of the messaging client application 104 in accordance with the selected levels of access 701. A graphical user interface 720 of the messaging client application 104 indicates that the third-party application 603 is now in a connected state. An option 703 allows a user to disconnect the given third-party application 603 and revoke the token provided to the third-party application 603.

Figure 8A:
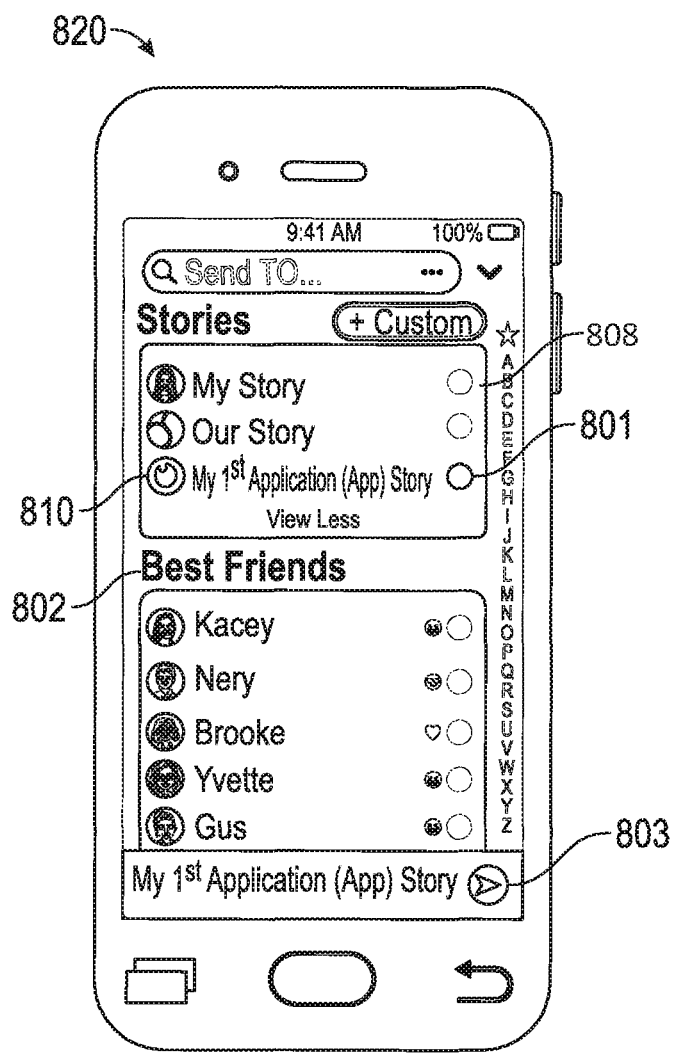

The graphical user interfaces of the messaging client application 104 shown in FIGS. 8A-8D include a screen 820 with options allowing a user to selectively choose targets (e.g., friends and/or third-party applications 105) with which to share a media item by the messaging client application 104. For example, as shown in FIG. 8A, a share option 801 is presented in association with a given third-party application 105 to share a media item 808 (that is selected in the screen 820) (e.g., "my story") that includes a sequence of video clips. In response to the user tapping on the share option 801, a checkmark is presented indicating that the user has selected to share the media item and enable access to the media item by the third-party application 105. The graphical user interface represents the third-party application 105 associated with the share option 801 using a graphical representation 810 unique to the third-party application 105. The graphical representation 810 may be a logo associated with the third-party application 105 and may be provided to the messaging client application 104 by the third-party application 105. The user can also choose one or more friends listed in a friends region 802 with whom to share the specific media item "my story."

In response to receiving a user selection of a send option 803, the messaging client application 104 transmits the media item to any friends selected in the friends region 802 using a message, such as a group message, of the messaging client application 104. In response to receiving a user selection of the send option 803, the messaging client application 104 transmits the media item or an identifier of the media item to any third-party applications 105 identified, such as the third-party application 105 associated with the share option 801. Specifically, the messaging client application 104 enables the third-party application 105 associated with the share option 801 to access the particular media item "my story."

Figure 8B:
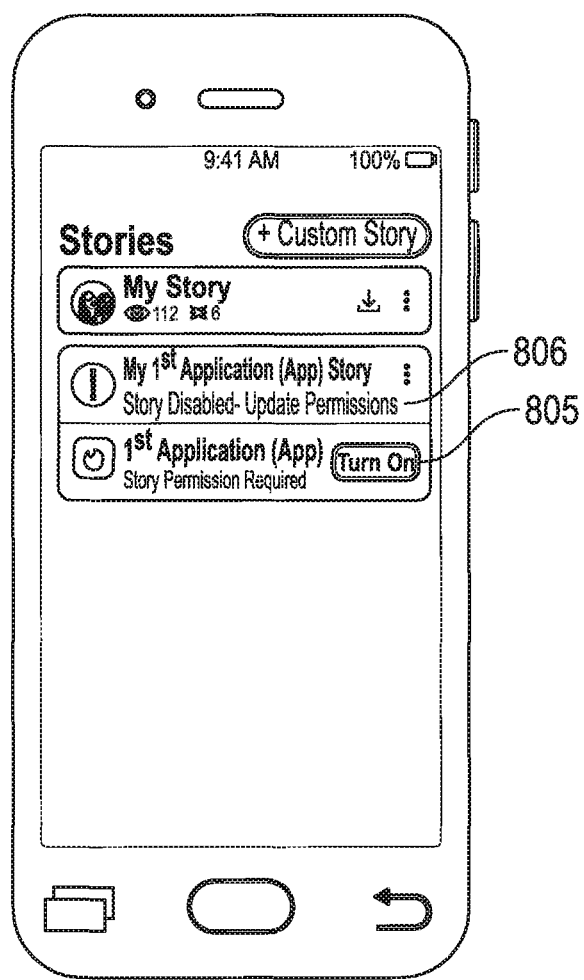

In some embodiments, a given third-party application 105 may be determined to be in a disconnected state. In such cases, the third-party application 105 may be represented in the screen 820 with an option to connect the third-party application 105. Namely, as shown in FIG. 8B, the screen may present an indication 806 that the particular third-party application 105 is in a disabled state or that the feature of the messaging client application 104 to share the media item is not enabled for the third-party application 105 (even though the third-party application 105 is connected). For example, the user may have set permissions or restrictions for sharing the authentication information of the messaging client application 104 with the third-party application 105 that prevent sharing media items. In such cases, the screen 820 may present the indication 806 that the particular third-party application 105, which is connected to the messaging client application 104, is in a disabled state because the sharing option is not available. A turn-on option 805 is presented as shown in FIG. 8B. In response to a user selection of the turn-on option 805, the permissions or restrictions are changed to the connected state and/or the messaging client application 104 sets the associated third-party application 105 to the connected state by sharing the authentication information of the messaging client application 104 with the third-party application 105. In response to selection of the turn-on option 805, the share option 801 (FIG. 8A) may be presented in association with the particular third-party application 105 in the screen 820.

Figure 8C:
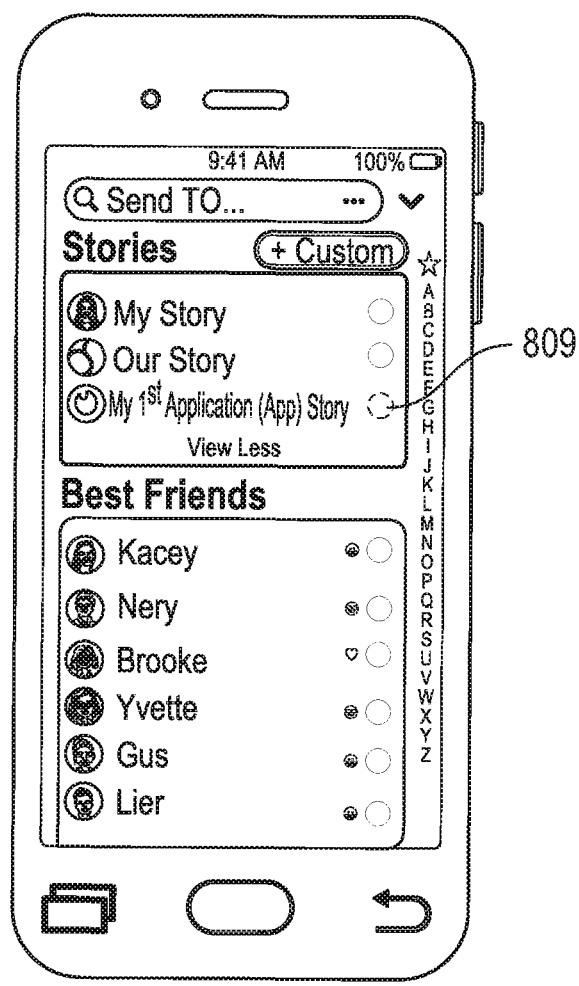

In some embodiments, the messaging client application 104 may determine that the media item includes copyright protection or is associated with a particular sponsorship restriction that disallows access to the media item outside of (by any application other than) the messaging client application 104. In such cases, as shown in FIG. 8C, the screen may present a third-party application 105 that is connected to the messaging client application 104 in a greyed-out state 809 or without the share option 801 (represented by the dotted lines). This prevents the user from including the third-party application 105 in the selection of the targets with which to share the particular media item. Other targets, such as other users or friends of the user in the messaging client application 104, are simultaneously presented for selection to share the media item, while the third-party application 105 is presented in a greyed-out state 809 or without the share option 801.

Figure 8D:
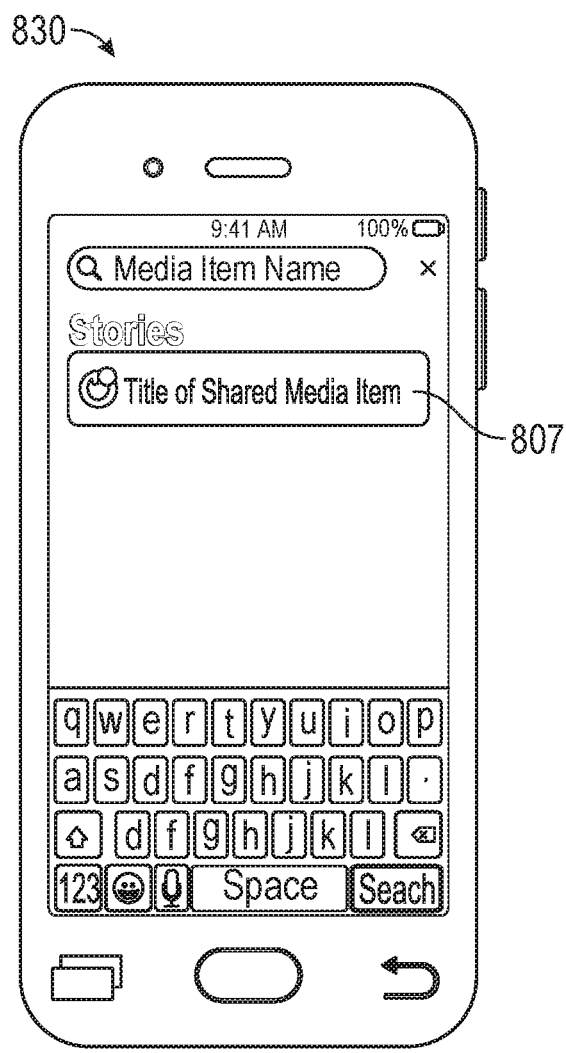

As shown in FIG. 8D, the messaging client application 104 may present a search screen 830. The search screen 830 allows a user to type in or input a title of a given media item in a search box to find which media items of the messaging client application 104 are currently being shared with third-party applications 105. Any media item with a matching title to that typed into the search box and which is determined to be shared, or for which access is enabled by one or more third-party applications 105, is presented among search results 807. A user can tap or select any given search result to disable access by the third-party applications 105.

Figure 9:
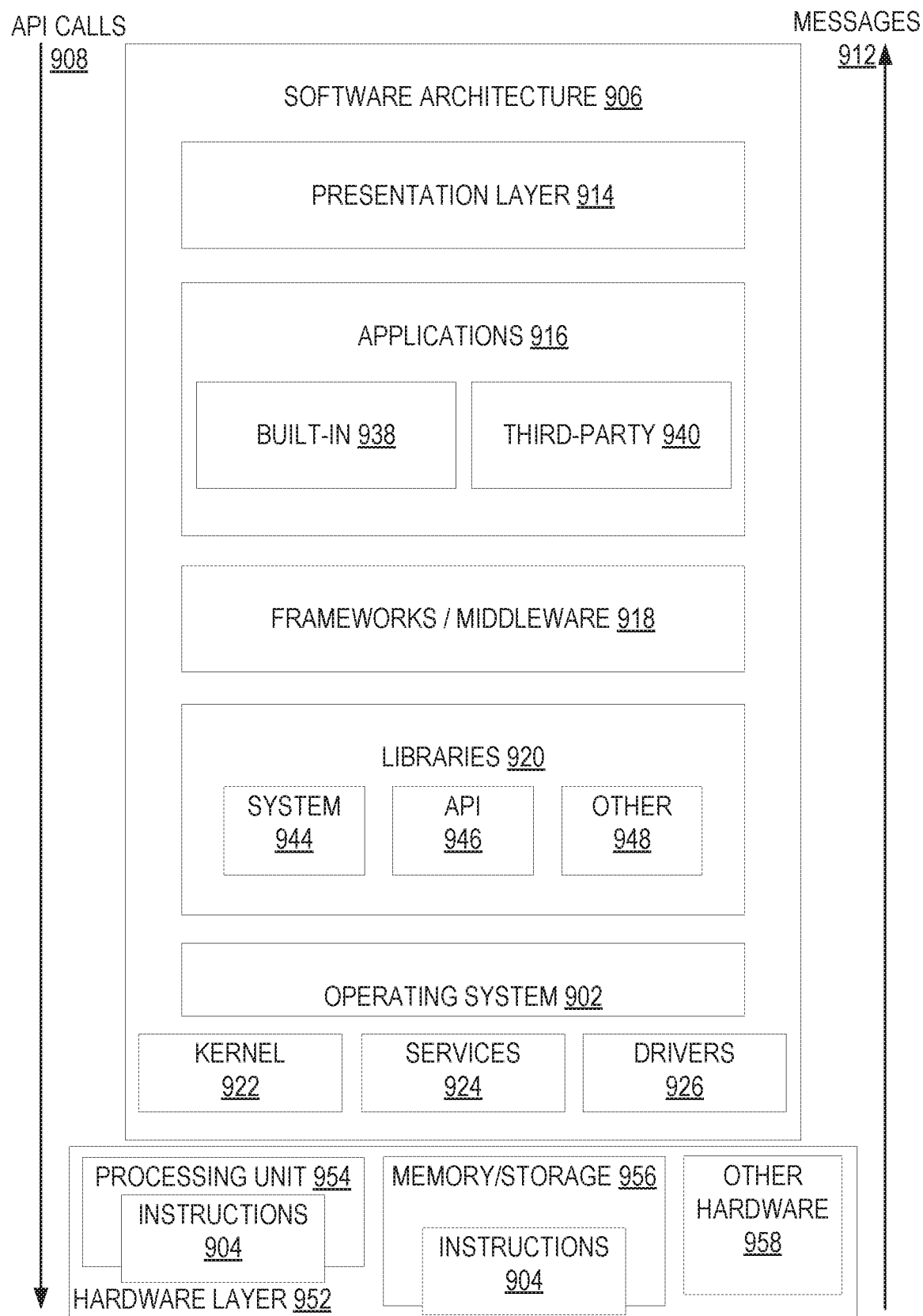
FIG. 9 is a block diagram illustrating a representative software architecture, which may be used in conjunction with various hardware architectures herein described, according to example embodiments.

FIG. 9 is a block diagram illustrating an example software architecture 906, which may be used in conjunction with various hardware architectures herein described. FIG. 9 is a non-limiting example of a software architecture, and it will be appreciated that many other architectures may be implemented to facilitate the functionality described herein. The software architecture 906 may execute on hardware such as a machine 1000 of FIG. 10 that includes, among other things, processors 1004, memory 1006, and input/output (I/O) components 1018. A representative hardware layer 952 is illustrated and can represent, for example, the machine 1000 of FIG. 10. The representative hardware layer 952 includes a processing unit 954 having associated executable instructions 904. The executable instructions 904 represent the executable instructions of the software architecture 906, including implementation of the methods, components, and so forth described herein. The hardware layer 952 also includes memory and/or storage modules memory/storage 956, which also have the executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke API calls 908 through the software stack and receive messages 912 in response to the API calls 908. The layers illustrated are representative in nature, and not all software architectures have all layers. For example, some mobile or special-purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than by interfacing directly with the underlying operating system 902 functionality (e.g., kernel 922, services 924, and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media formats such as MPEG4, H.264, MP3, AAC, AMR, JPG, PNG), graphics libraries (e.g., an OpenGL framework that may be used to render two-dimensional and three-dimensional graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 provide a higher-level common infrastructure that may be used by the applications 916 and/or other software components/modules. For example, the frameworks/middleware 918 may provide various graphic UI (GUI) functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. The third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as the operating system 902) to facilitate functionality described herein.

The applications 916 may use built-in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as the presentation layer 914. In these systems, the application/component "logic" can be separated from the aspects of the application/component that interact with a user.

Figure 10:
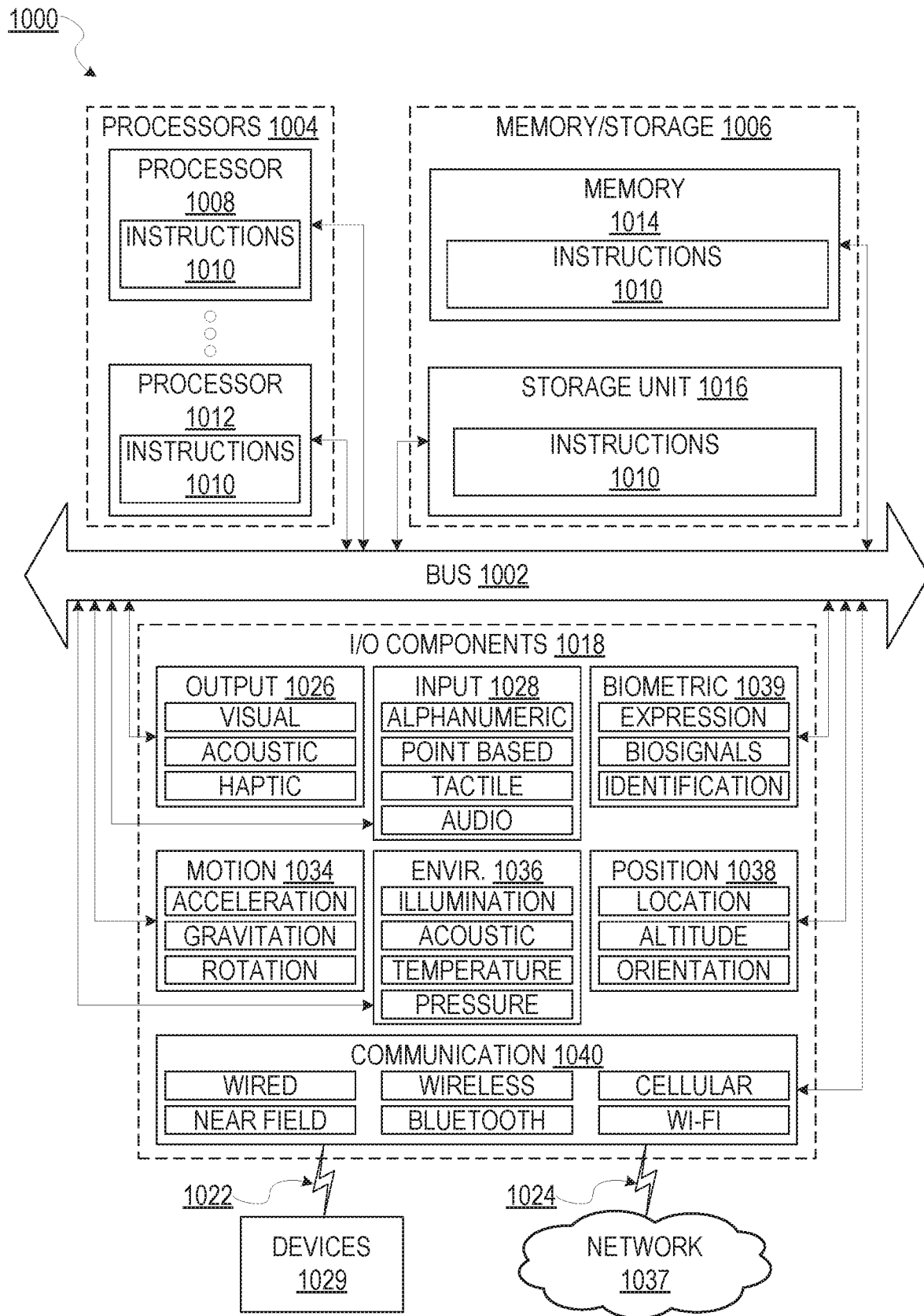
FIG. 10 is a block diagram illustrating components of a machine able to read instructions from a machine-readable medium (e.g., a machine-readable storage medium) and perform any one or more of the methodologies discussed herein, according to example embodiments.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically. FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by the machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. In an example embodiment, the processors 1004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1008 and a processor 1012 that may execute the instructions 1010. The term "processor" is intended to include multi-core processors 1004 that may comprise two or more independent processors (sometimes referred to as "cores") that may execute instructions contemporaneously. Although FIG. 10 shows multiple processors 1004, the machine 1000 may include a single processor with a single core, a single processor with multiple cores (e.g., a multi-core processor), multiple processors with a single core, multiple processors with multiple cores, or any combination thereof.

The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of the processors 1004 are examples of machine-readable media.

The I/O components 1018 may include a wide variety of components to receive input, provide output, produce output, transmit information exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion, and the grouping is in no way limiting. In various example embodiments, the I/O components 1018 may include output components 1026 and input components 1028. The output components 1026 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1039, motion components 1034, environmental components 1036, or position components 1038 among a wide array of other components. For example, the biometric components 1039 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1037 or devices 1029 via a coupling 1024 and a coupling 1022, respectively. For example, the communication components 1040 may include a network interface component or other suitable device to interface with the network 1037. In further examples, the communication components 1040 may include wired communication components, wireless communication components, cellular communication components, Near Field Communication (NFC) components, Bluetooth® components (e.g., Bluetooth@ Low Energy), Wi-Fi@ components, and other communication components to provide communication via other modalities. The devices 1029 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components. NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geo-location, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying transitory or non-transitory instructions for execution by the machine, and includes digital or analog communications signals or other intangible media to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop. PDA, smart phone, tablet, ultra book, netbook, laptop, multi-processor system, microprocessor-based or programmable consumer electronic system, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi@ network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, a device, or other tangible media able to store instructions and data temporarily or permanently, and may include, but is not limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points. APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instant in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instant of time and to constitute a different hardware component at a different instant of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
    generating, with a messaging application, a media item using a camera of a client device;
    identifying, by one or more processors, a target application that has been previously authorized by the messaging application to share authentication information with the messaging application;
    in response to identifying the target application that has been previously authorized to share authentication information with the messaging application, determining that the target application, that is authorized to share authentication information with the messaging application, is restricted from receiving media items from the messaging application;
    in response to determining that the target application, that is authorized to share authentication information with the messaging application, is restricted from receiving media items from the messaging application, generating for display an indicator that specifies the target application is in a disabled state with an option to enable sharing of the media items from the messaging application with the target application;
    in response to receiving a user selection of the option to enable sharing of the media items from the messaging application with the target application that is included in the indicator that specifies the target application is in a disabled state, generating, by the one or more processors, for display in a graphical user interface of the messaging application and in association with the target application, a share option associated with the media item; and
    in response to receiving a user selection of the share option, enabling, by the one or more processors, the target application to access the media item.

2. The method of claim 1, wherein the target application is a third-party application relative to the messaging application, the third-party application being provided by an entity unaffiliated with the messaging application, further comprising:
    retrieving a list of applications that are installed on the client device;
    based on the list of applications that are installed on the client device, searching for a set of applications that are not currently installed on the client device and that are configured to share authentication information with the messaging application; and
    in response to identifying the target application as included in the set of applications that are not currently installed on the client device, displaying an option to download the target application and authorize the messaging application to share the authentication information with the target application, wherein a prompt is presented in response to receiving a user selection of the option to download the target application indicating a level of access that is requested by the target application.

3. The method of claim 1, wherein the messaging application is provided by a first entity or organization, and wherein the target application is provided by a second entity or organization different from the first entity or organization, wherein the media item is encoded in a proprietary format of the messaging application, and further comprising decoding the media item that is encoded in the proprietary format of the messaging application using a decoder of the messaging application to enable the target application to access the media item.

4. The method of claim 1, wherein the media item comprises a playlist including a plurality of videos, further comprising:
    presenting in a concurrent display a plurality of identifiers representing applications that have been previously authorized by the messaging application to share authentication information with the messaging application, the identifiers comprising an identifier of the target application;
    presenting, with each of the plurality of identifiers, a level of authentication information that is being shared with each application, wherein the target application is associated with a first level of authentication information and a given application associated with one of the plurality of identifiers is associated with a second level of authentication information; and
    receiving input that interacts with the plurality of identifiers to selectively modify the level of authentication information that is being shared with each application.

5. The method of claim 4, further comprising presenting an option for each identifier to discontinue sharing the authentication information with the respective application associated with the identifier, and wherein enabling the target application to access the media item comprises:
- transmitting an identifier of the media item to the target application; and
- playing the media item through a graphical user interface of the target application based on the identifier.

6. The method of claim 5, wherein playing the media item further comprises:
- accessing a media decoder of the messaging application through an application programming interface (API) of the messaging application;
- decoding the media item using the media decoder of the messaging application; and
- displaying the decoded media item via the graphical user interface of the target application.

7. The method of claim 5 further comprising displaying an option to simultaneously authorize sharing of authentication information with all applications or simultaneously discontinue sharing of authentication information with all applications.

8. The method of claim 5 further comprising generating, with the messaging application, a viewing metric representing viewership of the media item on the messaging application and on the target application.

9. The method of claim 2 wherein searching for the set of applications that are configured to share authentication information with the messaging application comprises determining that each application in the set of applications supports an authentication protocol that corresponds to the authentication protocol of the messaging application.

10. The method of claim 1 further comprising:
- displaying, with the messaging application, an indication that access to the media item by the target application has been enabled;
- determining that a given application is not authorized to share authentication information with the messaging application; and
- in response to determining that the given application is not authorized to share authentication information with the messaging application, presenting another indication that the given application is in a disabled state and that a feature of the messaging application to share the media item is not enabled for the given application.

11. The method of claim 10 further comprising:
- receiving user input that disables access to the media item by the target application;
- preventing the target application from accessing the media item; and
- updating the indication to indicate that access to the media item by the target application has been disabled in response to receiving the user input.

12. The method of claim 1 further comprising:
- receiving a request from the target application via an application programming interface (API) of the messaging application to play the media item;
- determining that the target application is authorized to access the media item; and
- in response to determining that the target application is authorized to access the media item, enabling the target application to decode the media item through the API of the messaging application.

13. The method of claim 1 further comprising displaying with the messaging application a search interface allowing a user to search for all media items that are being shared by the messaging application with the target application.

14. The method of claim 1, wherein the share option includes a graphical representation of the target application, the graphical representation being received from the target application.

15. The method of claim 1, wherein access by the target application to the media item is automatically disabled after a threshold time interval.

16. The method of claim 1 further comprising:
- receiving user input that deletes the media item via the messaging application; and
- preventing the messaging application and the target application from accessing the media item in response to receiving the user input.

17. The method of claim 1 further comprising:
- in response to receiving the user selection of the share option, generating an authentication token based on a user account of the messaging application; and
- transmitting the authentication token to the target application.

18. The method of claim 1 further comprising preventing the media item from being shared with the target application in response to determining that sharing the media item violates copy protection.

19. A system comprising:
- a processor configured to perform operations comprising:
  - generating, with a messaging application, a media item using a camera of a client device;
  - identifying a target application that has been previously authorized by the messaging application to share authentication information with the messaging application;
  - in response to identifying the target application that has been previously authorized to share authentication information with the messaging application;
  - determining that the target application, that is authorized to share authentication information with the messaging application, is restricted from receiving media items from the messaging application;
  - in response to determining that the target application, that is authorized to share authentication information with the messaging application, is restricted from receiving media items from the messaging application, generating for display an indicator that specifies the target application is in a disabled state with an option to enable sharing of the media items from the messaging application with the target application;
  - in response to receiving a user selection of the option to enable sharing of the media items from the messaging application with the target application that is included in the indicator that specifies the target application is in a disabled state, generating, in association with the target application, a share option associated with the media item for display in a graphical user interface of the messaging application; and
  - in response to receiving a user selection of the share option, enabling the target application to access the media item.

20. A non-transitory machine-readable storage medium that includes instructions that, when executed by one or more processors of a machine, cause the machine to perform operations comprising:
- generating, with a messaging application, a media item using a camera of a client device;
- identifying a target application that has been previously authorized by the messaging application to share authentication information with the messaging application;

in response to identifying the target application that has been previously authorized to share authentication information with the messaging application;

determining that the target application, that is authorized to share authentication information with the messaging application, is restricted from receiving media items from the messaging application;

in response to determining that the target application, that is authorized to share authentication information with the messaging application, is restricted from receiving media items from the messaging application, generating for display an indicator that specifies the target application is in a disabled state with an option to enable sharing of the media items from the messaging application with the target application;

in response to receiving a user selection of the option to enable sharing of the media items from the messaging application with the target application that is included in the indicator that specifies the target application is in a disabled state, generating, in association with the target application, a share option associated with the media item for display in a graphical user interface of the messaging application; and in response to receiving a user selection of the share option, enabling the target application to access the media item.

* * * * *